US012807070B2

(12) United States Patent
Arthur

(10) Patent No.: US 12,807,070 B2
(45) Date of Patent: Nov. 24, 2026

(54) TEMPORARY MIRROR ASSEMBLY

(71) Applicant: Dean Arthur, Wynnewood, PA (US)

(72) Inventor: Dean Arthur, Wynnewood, PA (US)

( * ) Notice: Subject to any disclaimer, the term of this patent is extended or adjusted under 35 U.S.C. 154(b) by 259 days.

(21) Appl. No.: 18/389,040

(22) Filed: Nov. 13, 2023

(65) Prior Publication Data

US 2024/0227676 A1 Jul. 11, 2024

Related U.S. Application Data

(60) Provisional application No. 63/424,925, filed on Nov. 13, 2022.

(51) Int. Cl.
*B60R 1/078* (2006.01)

(52) U.S. Cl.
CPC .................................... *B60R 1/078* (2013.01)

(58) Field of Classification Search
CPC ........... B60R 1/074; B60R 1/078; B60R 1/02; B60R 1/06; B60R 1/14; B60R 13/00; F16M 11/22; B62D 25/20
See application file for complete search history.

(56) References Cited

U.S. PATENT DOCUMENTS 4,111,532 A * 9/1978 Budish .................... B60R 1/078 359/872
6,325,121 B1 * 12/2001 Hudnall .................. B60J 11/06 150/166
2004/0190167 A1 * 9/2004 Berger .................... B60R 1/008 359/879

FOREIGN PATENT DOCUMENTS

EP 1806260 A1 * 7/2007 ............. B60R 1/081
WO WO-0056576 A1 * 9/2000 ............... B60R 1/06
WO WO-2015028308 A1 * 3/2015 ............... B60R 1/06

* cited by examiner

*Primary Examiner* — Pinping Sun
*Assistant Examiner* — Ruby L Kauffman
(74) *Attorney, Agent, or Firm* — PAUL & PAUL

(57) ABSTRACT

A temporary side view mirror assembly for a motor vehicle includes a rigid base to which a replacement mirror is mounted by means of a universal joint. The assembly is secured to a damaged side view mirror of motor vehicle, and the replacement mirror is manually adjusted.

6 Claims, 7 Drawing Sheets

TEMPORARY MIRROR ASSEMBLY

CROSS-REFERENCE TO RELATED APPLICATION

This application claims the benefit of U.S. Provisional Patent Application 63/424,925, filed Oct. 13, 2022, which is incorporated herein by reference.

BACKGROUND OF THE INVENTION

1. Field of the Invention

The present invention relates to after-market products for vehicles.

2. Brief Description of the Prior Art

An all-too-common experience for owners of motor vehicles is to find that their vehicle has been damaged while parked because another vehicle has struck and damaged the exterior rear side view mirror leaving the vehicle in a potentially dangerous state. Side view mirrors by necessity extend outward from the side of the vehicle, leaving them susceptible to contact by careless or inattentive drivers passing the parked vehicle. Side view mirrors are important safety devices, and the ability to monitor either side of a vehicle being driven to alert the driver to potential hazards such as passing traffic is valuable.

A driver confronting a newly damaged side view mirror is frequently confronted with a difficult decision. Many times, the driver of the vehicle responsible for the damage is either unaware of the contact causing the damage, or simply does not care to stop to alert the owner of the damaged vehicle. Thus, discovery of the damage is likely to be an unwelcome surprise. Now the driver of the damaged vehicle must decide whether the vehicle is "drivable" as is, or must be repaired before the vehicle can be used. While this might not be a significant issue for an affluent owner of several alternative vehicles, for most the press of circumstances (e.g., "our child will be late for school" or "I may miss that important medical appointment") will temp the owner to drive the damaged vehicle. Repairing the damage may require relinquishing the vehicle for several days or longer while parts are ordered, the damaged mirror assembly is removed, etc. There is a need for a solution quickly providing a vehicle which is safe to drive, at least on a temporary basis.

SUMMARY OF THE INVENTION

The present invention provides a temporary side view mirror assembly for a motor vehicle. The assembly comprises a housing, preferably having a first compartment having an exterior wall and a second compartment, with a rigid base separating the first compartment and the second compartment. The assembly also includes a universal or ball joint mounted to the rigid base. The ball joint preferably has a member extending to or through the exterior wall of the first compartment. In addition, the assembly has a mirror mounted to the member, such that the orientation of the mirror relative to the rigid base is adapted for adjustment by a user. The second compartment is preferably adapted to be positioned over a damaged exterior side view motor vehicle mirror. The assembly also preferably includes means for securing the housing to the damaged exterior side view motor vehicle mirror or elsewhere on the side of the vehicle. In one presently preferred embodiment, the housing comprises a fabric material. Preferably, the means for securing the side view mirror assembly comprises at least one strap.

DETAILED DESCRIPTION

The present invention provides a temporary side view mirror assembly that can used to temporarily repair a damaged side view mirror on a vehicle. The temporary mirror assembly can be used until the damaged mirror can be replaced or repaired. The The temporary mirror assembly can easily be installed without requiring the usage of tools. In one presently preferred embodiment, the temporary mirror assembly can be simply wrapped around or slid onto the housing of the broken side view mirror.

Once the temporary mirror assembly is installed, the mirror can be adjusted to provide a suitable rear view for the vehicle driver. Objects in temporary mirror may actually be closer than they appear, depending on the geometry of the replacement temporary mirror.

The temporary mirror assembly is universal, in the sense that it fits most vehicles. However, the temporary mirror assembly can be provided in different sizes to fit smaller or larger vehicles; such as small, medium, and large.

The temporary mirror assembly includes a housing, such as a flexible fabric satchel or the like.

The housing includes a first compartment open at one end for sliding over a damaged rearview mirror, and a second compartment, inside of which is mounted a universal or ball joint, one end of which is attached to a mirror on the exterior of the container, the other end which is secured to a rigid base separating the first and second compartments. Preferably, each of the first and second compartments are provided with means for opening and closing the compartments, such as zippers, snaps, buttons or the like.

The first compartment is placed over a damaged rearview mirror and, and the container is secured to the damaged rearview mirror using, for example, straps provided with Velcro or other attachment means such that the base is rigidly positioned with respect to the damaged rearview mirror, and such that the housing and the one end of the universal joint are fixed in position.

The position of the exterior mirror is then manually adjusted by moving the mirror mounted on the universal joint to provide the driver with a suitable rear view.

The universal joint can be provided with a means for adjusting the tightness of the joint such as an adjustment collar.

The first compartment of the housing can be provided with a zipper, draw string, or other means for opening the housing to permit the housing to be placed over the damaged rearview mirror, and the first compartment can then be closed to help secure the product to the damaged mirror.

In an alternative embodiment of the invention, the housing comprises a single compartment, with the rigid base being affixed to a wall of the housing. In yet another alternative embodiment, no housing is provided, and the rigid base is provides with attachment means such as straps to attach the base directly to the damaged vehicle.

Figure 1:
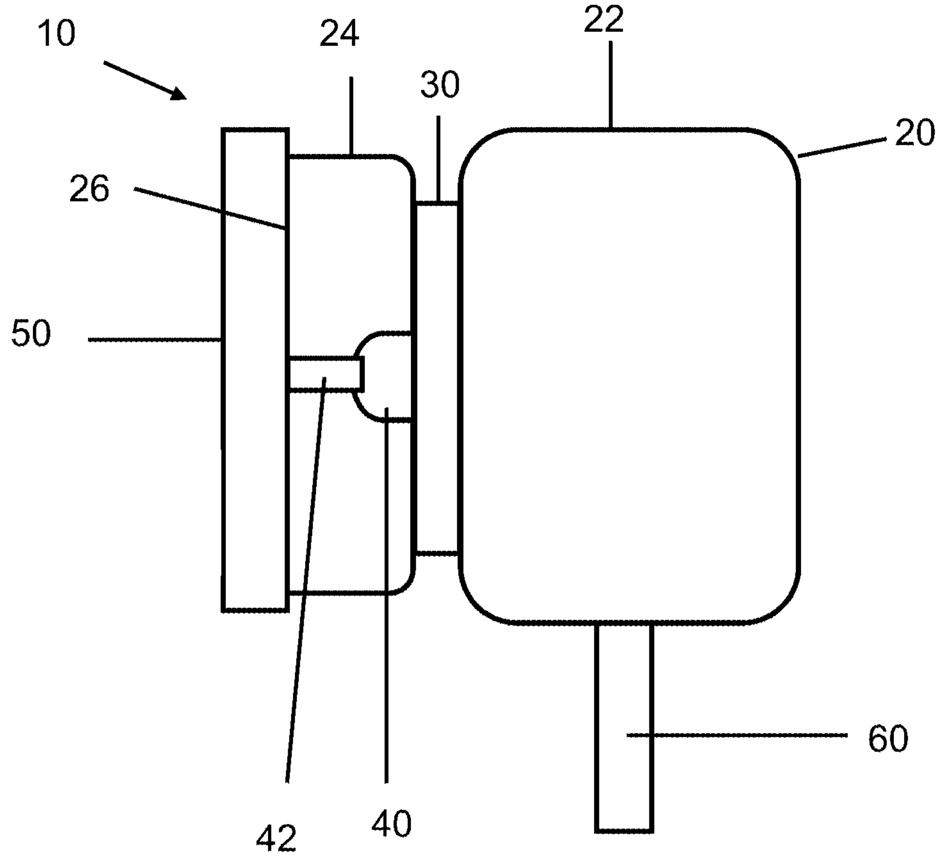
FIG. 1 is schematic side elevational view of an embodiment of the present invention.
Figure 2:
FIG. 2 is a side view of temporary mirror assembly according to the present invention showing the housing opened to reveal a universal joint. The replacement mirror is on top of the housing, and a strap for attaching the temporary mirror to a damaged rearview mirror is shown on the bottom.
Figure 3:
FIG. 3 is a top view of temporary mirror assembly of FIG. 2 showing a replacement mirror affixed to the housing.
Figure 4:
FIG. 4 is rear view of the temporary mirror assembly of FIG. 2.
Figure 5:
FIG. 5. is side view of the temporary mirror assembly of FIG. 2 showing first compartment open to receive damaged rearview mirror.
Figure 6:
FIG. 6 is a side view of the temporary mirror assembly of FIG. 2 with second compartment in an open position to show the universal joint.
Figure 7:
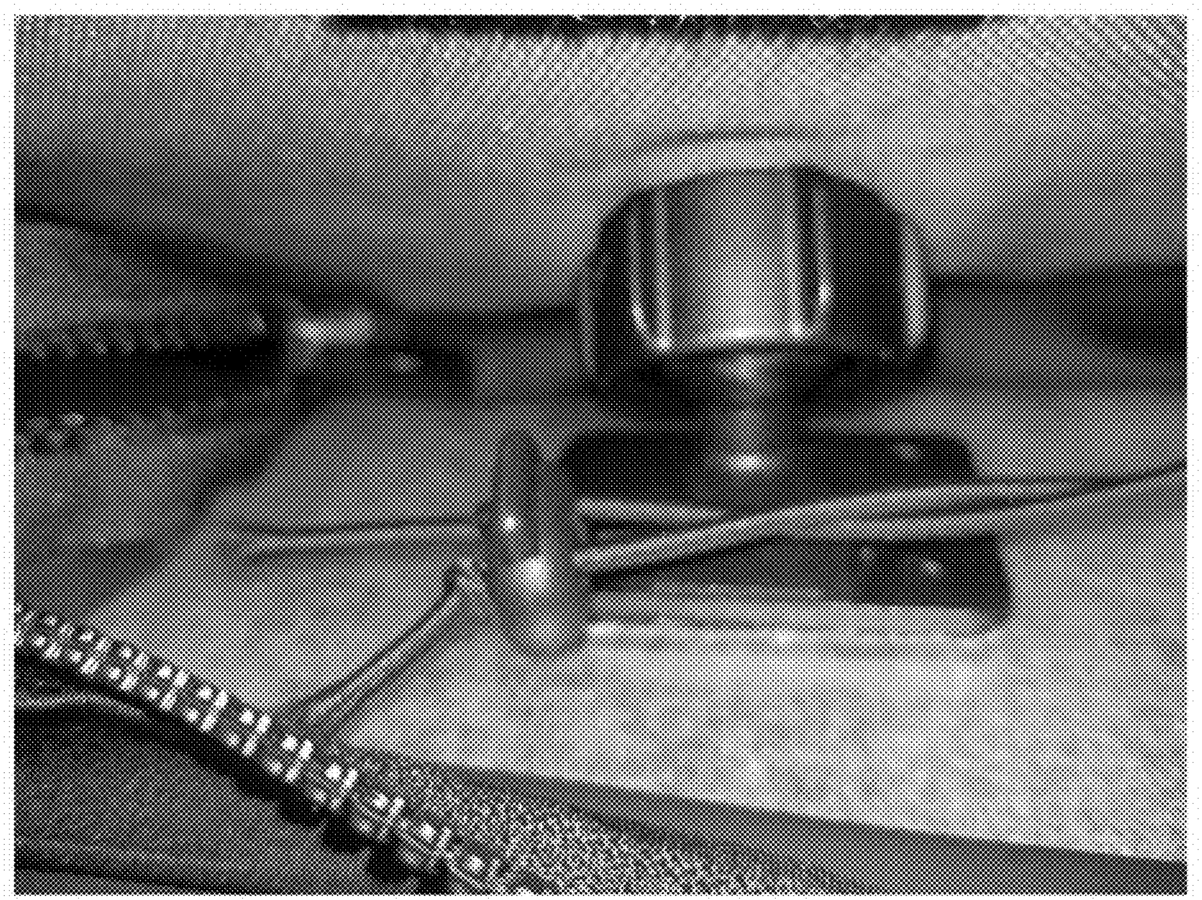
FIG. 7. is an enlarged view of the temporary mirror assembly of FIG. 2 of the universal joint showing an adjustment collar for fixing the position of replacement mirror.

A presently preferred embodiment of the invention is depicted in the schematic side elevation view of FIG. 1. The temporary mirror assembly 10 is provides with a housing 20; which is divided into a first compartment 22 and a second compartment 24. Preferably, the housing 10 is formed from a flexible material, such as an outdoor grade fabric. The first compartment 22 is separated from the second compartment 24 by a rigid base or wall 30. A universal or ball joint 40 is mounted on the rigid base 30. The universal joint 40 includes a member 42 which protrudes through an exterior wall 26 of the housing 20, and a temporary rear view mirror 50 is affixed to the member 42. Alternatively, the member 42 extends up to and abuts the interior surface of the exterior wall 26, and the temporary rear view mirror 50 is affixed to the member 42 by attachment means such as screws extending through the exterior wall 26. The second compartment 24 of the housing 20 is positioned by a user over the broken original side view mirror and secured by attachment means such as a strap 60 or the like which is adapted to tightly secure the temporary mirror assembly 10 to the motor vehicle.

Various modifications can be made in the details of the various embodiments of the apparatus of the present invention, all within the scope and spirit of the invention as defined by the appended claims.

The invention claimed is:

1. A temporary side view mirror assembly for a motor vehicle, the assembly comprising: a housing, the housing having a first compartment having an exterior wall and a second compartment, a rigid base separating the first compartment and the second compartment, a universal or ball joint mounted to the rigid base, the universal or ball joint having a member extending to the exterior wall of the first compartment, a mirror mounted to the member, such that an orientation of the mirror relative to the rigid base is adapted for adjustment by a user, the second compartment being adapted to be positioned over a damaged exterior side view motor vehicle mirror, and means for securing the housing to the damaged exterior side view motor vehicle mirror.

2. The temporary side view mirror assembly of claim 1 wherein the housing comprises a fabric material.

3. The temporary side view mirror assembly of claim 1 wherein the means for securing the housing to the damaged exterior side view motor vehicle mirror comprises at least one strap.

4. A temporary side view mirror assembly for a motor vehicle, the assembly comprising: a housing, the housing having a first compartment having an exterior wall and a second compartment, rigid base separating the first compartment and the second compartment, a universal or ball joint mounted to the rigid base, the universal or ball joint having a member extending to the exterior wall of the first compartment, a mirror mounted to the member, such that an orientation of the mirror relative to the rigid base is adapted for adjustment by a user, and the second compartment being adapted to be positioned over a damaged exterior side view motor vehicle mirror.

5. The temporary side view mirror assembly of claim 4 wherein the housing comprises a fabric material.

6. The temporary side view mirror assembly of claim 4 wherein a means for securing the side view mirror assembly comprises at least one strap.

* * * * *